(12) United States Patent
Kuboki et al.

(10) Patent No.: US 10,910,156 B2
(45) Date of Patent: Feb. 2, 2021

(54) POWER STORAGE MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hideyuki Kuboki, Mie (JP); Hiroki Hirai, Mie (JP); Makoto Higashikozono, Mie (JP); Akihisa Hosoe, Osaka (JP); Yoshiyuki Hirose, Osaka (JP); Akihiro Nagafuchi, Osaka (JP); Tomoharu Takeyama, Osaka (JP); Eiichi Kobayashi, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES. LTD., Osaka (JP)

( * ) Notice: Subject to any disclaimer, the term of this patent is extended or adjusted under 35 U.S.C. 154(b) by 11 days.

(21) Appl. No.: 16/323,592

(22) PCT Filed: Jul. 27, 2017

(86) PCT No.: PCT/JP2017/027156
§ 371 (c)(1),
(2) Date: Feb. 6, 2019

(87) PCT Pub. No.: WO2018/034122
PCT Pub. Date: Feb. 22, 2018

(65) Prior Publication Data
US 2019/0172639 A1 Jun. 6, 2019

(30) Foreign Application Priority Data
Aug. 16, 2016 (JP) .................................. 2016-159719

(51) Int. Cl.
*H01M 10/625* (2014.01)
*H01M 10/653* (2014.01)
(Continued)

(52) U.S. Cl.
CPC ............... *H01G 2/08* (2013.01); *H01G 11/12* (2013.01); *H01G 11/18* (2013.01); *H01M 2/10* (2013.01);
(Continued)

(58) Field of Classification Search
None
See application file for complete search history.

(56) References Cited

U.S. PATENT DOCUMENTS

| 4,578,324 A | 3/1986 | Koehler et al. |
| 9,083,066 B2 | 7/2015 | Ketkar et al. |

(Continued)

FOREIGN PATENT DOCUMENTS

| JP | 61-173470 | 8/1986 |
| JP | 2010-211963 | 9/2010 |

(Continued)

OTHER PUBLICATIONS

International Search Report in International Application No. PCT/JP2017/027156, dated Oct. 24, 2017.

*Primary Examiner* — Scott J. Chmielecki
(74) *Attorney, Agent, or Firm* — Greenblum & Bernstein, P.L.C.

(57) ABSTRACT

A power storage module includes: a power storage element; a cooling member that has a coolant and a sealing body hermetically sealing the coolant, is stacked on the power storage element, and is configured to form a bulging portion by deformation of the sealing body caused by evaporation of the coolant in a region not overlapping the power storage element; a heat transfer plate that is stacked on the power (Continued)

storage element with the cooling member sandwiched therebetween; and an elastic member that abuts with the heat transfer plate and the bulging portion and is elastically deformable.

6 Claims, 13 Drawing Sheets

(51) Int. Cl.
| | |
|---|---|
| *H01G 2/08* | (2006.01) |
| *H01G 11/12* | (2013.01) |
| *H01G 11/18* | (2013.01) |
| *H01M 2/10* | (2006.01) |
| *H01M 10/647* | (2014.01) |
| *H01M 10/6567* | (2014.01) |
| *H01M 10/6552* | (2014.01) |
| *H01M 10/6555* | (2014.01) |
| *H01M 10/613* | (2014.01) |
| *H01M 10/6569* | (2014.01) |

(52) U.S. Cl.
CPC ....... *H01M 2/1077* (2013.01); *H01M 10/613* (2015.04); *H01M 10/625* (2015.04); *H01M 10/647* (2015.04); *H01M 10/653* (2015.04); *H01M 10/6552* (2015.04); *H01M 10/6555* (2015.04); *H01M 10/6567* (2015.04); *H01M 10/6569* (2015.04)

(56) References Cited

U.S. PATENT DOCUMENTS

| | | | |
|---|---|---|---|
| 10,461,366 B1 * | 10/2019 | Anderson | H01M 4/386 |
| 2007/0298267 A1 * | 12/2007 | Zhong | H01M 8/0206 |
| | | | 428/447 |
| 2012/0164492 A1 | 6/2012 | Lachenmeier et al. | |
| 2014/0130969 A1 * | 5/2014 | McCutcheon | B32B 38/10 |
| | | | 156/247 |
| 2014/0147709 A1 | 5/2014 | Ketkar et al. | |
| 2014/0377543 A1 * | 12/2014 | Lodde | C09J 133/06 |
| | | | 428/331 |
| 2016/0141728 A1 | 5/2016 | Fauteux et al. | |
| 2016/0175767 A1 * | 6/2016 | Richter | B01D 71/025 |
| | | | 95/52 |
| 2016/0254537 A1 * | 9/2016 | Kamo | H01M 4/583 |
| | | | 429/231.8 |
| 2019/0097222 A1 * | 3/2019 | Feaver | H01M 4/366 |
| 2019/0181426 A1 * | 6/2019 | Park | H01M 4/625 |
| 2019/0355980 A1 * | 11/2019 | Holt | H01M 4/628 |
| 2020/0020935 A1 * | 1/2020 | Costantino | H01G 11/06 |

FOREIGN PATENT DOCUMENTS

| | | |
|---|---|---|
| JP | 2012-204129 | 10/2012 |
| JP | 2012-523655 | 10/2012 |
| JP | 2013-131428 | 7/2013 |
| JP | 2014-157721 | 8/2014 |
| JP | 2016-502234 | 1/2016 |
| WO | WO2014/206323 | 12/2014 |

* cited by examiner

POWER STORAGE MODULE

TECHNICAL FIELD

The present description discloses a technique for dissipating heat from a power storage element.

BACKGROUND ART

There has been conventionally known a technique for dissipating heat from a power storage element. Patent Document 1 describes that a battery module is stored in a pack case and positive terminals and negative terminals of a plurality of cells are electrically connected together via bus bars. When a coolant charged in the lower portion of the pack case becomes evaporated and condensed in the upper portion of the pack case, heat of the battery is dissipated to the outside.

RELATED ART DOCUMENT

Patent Document

Patent Document 1: Japanese Unexamined Patent Application Publication No. 2010-211963

DISCLOSURE OF THE PRESENT INVENTION

Problem to be Solved by the Invention

According to the technique described in Patent Document 1, the coolant needs to be evaporated and condensed in the pack case, and thus the entire pack case needs to be sealed. This causes a problem that it is not easy to simplify the configuration of the power storage module.

The technique disclosed herein is completed under the foregoing circumstances, and an object of the technique is to simplify the configuration of the power storage module.

Means for Solving the Problem

A power storage module described herein includes: a power storage element; a cooling member that has a coolant and a sealing body hermetically sealing the coolant, is stacked on the power storage element, and is configured to form a bulging portion by deformation of the sealing body caused by evaporation of the coolant in a region not overlapping the power storage element; a heat transfer plate that is stacked on the power storage element with the cooling member therebetween; and an elastic member that abuts with the heat transfer plate and the bulging portion and is elastically deformable.

According to the foregoing configuration, it is possible to dissipate heat from the power storage element via the cooling member in which the coolant is sealed in the sealing body and the heat transfer plate. Accordingly, as compared to the configuration in which the coolant is charged in a case where the power storage element is stored, for example, the case does not necessarily need to be sealed. This makes it possible to simplify the configuration of the power storage module. In the case of using the cooling member and the heat transfer plate for dissipating heat from the power storage element, when the bulging portion formed by the bulging and deformation of the sealing body is not in contact with the heat transfer plate, the heat of the bulging portion is dissipated via a space with low heat conductivity (air). This causes a problem of poor heat dissipation property of the bulging portion. According to the present configuration, when the elastic member abuts with the heat transfer plate and the bulging portion, the heat of the bulging portion is transferred to the heat transfer plate via the elastic member to allow heat dissipation to the outside via the heat transfer plate, thereby to improve heat dissipation property. In addition, the elastic member is elastically deformed according to the bulging of the bulging portion, so that it is possible to lengthen the time during which the elastic member is in contact with the bulging portion to improve thermal conductivity.

Embodiments of the technique described herein are preferably as described below.

The elastic member may be a sponge, and an outer surface of the sponge may contact a surface of the heat transfer plate.

The elastic member may be a spring, and an end portion of the spring may be fixed to at least one of the heat transfer plate and the bulging portion.

The heat transfer plate may have a partition wall that extends in a direction different from a surface on which the power storage element is stacked and separates the elastic member such that the partition wall and the elastic member abut with each other.

This makes it possible to transfer the heat of the bulging portion to the partition wall via the elastic member to improve heat dissipation property.

The power storage module may include a plurality of the cooling members, a plurality of the power storage elements, and a plurality of the heat transfer plates. The elastic member may be sandwiched between the heat transfer plates and the bulging portions.

Accordingly, it is possible to improve heat conductivity among the bulging portions, the heat transfer plates, and the elastic members.

The cooling member may include an absorption member that is disposed in the sealing body to absorb the coolant.

This makes the coolant easy to move by the absorption member, which makes it possible to improve the cooling performance of the cooling member.

Advantageous Effect of the Invention

According to the technique described herein, it is possible to simplify the configuration of the power storage module.

MODES FOR CARRYING OUT THE INVENTION

First Embodiment

A first embodiment will be described with reference to FIGS. 1 to 7. A power storage module 10 in the present embodiment is mounted in a vehicle such as an electric car or a hybrid car, for example, to supply electric power to a load such as a motor. Although the power storage module 10 can be disposed in any orientation, the following descriptions are based on the assumption that an X direction is a leftward direction, a Y direction is a forward direction, and a direction is an upward direction.

Power Storage Module 10

Figure 4:
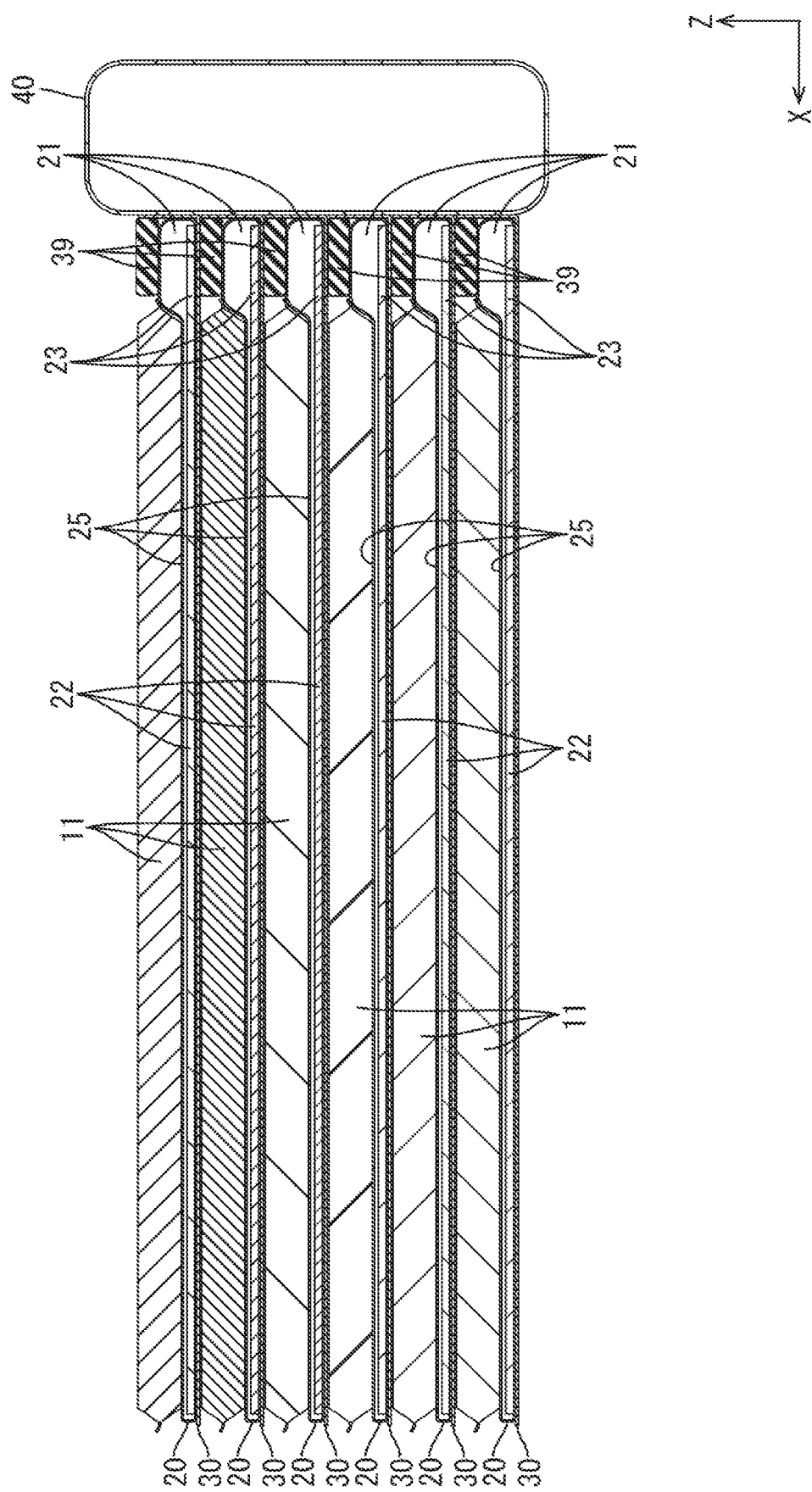
FIG. 4 is a cross-sectional view of FIG. 2 taken along line A-A.

As illustrated in FIG. 4, the power storage module 10 includes: a plurality of (six in the present embodiment) power storage elements 11; a plurality of (six in the present embodiment) cooling members 20 that are stacked on the power storage elements 11 to cool the power storage elements 11; plurality of (six in the present embodiment) heat transfer plates 30 that are stacked between the cooling members 20 and the power storage elements 11 to transmit heat from the cooling members 20 and the power storage elements 11; and elastic members 39 (six in the present embodiment) that contact the heat transfer plates 30 and the cooling members 20 and are elastically deformable.

Power Storage Elements 11

Figure 1:
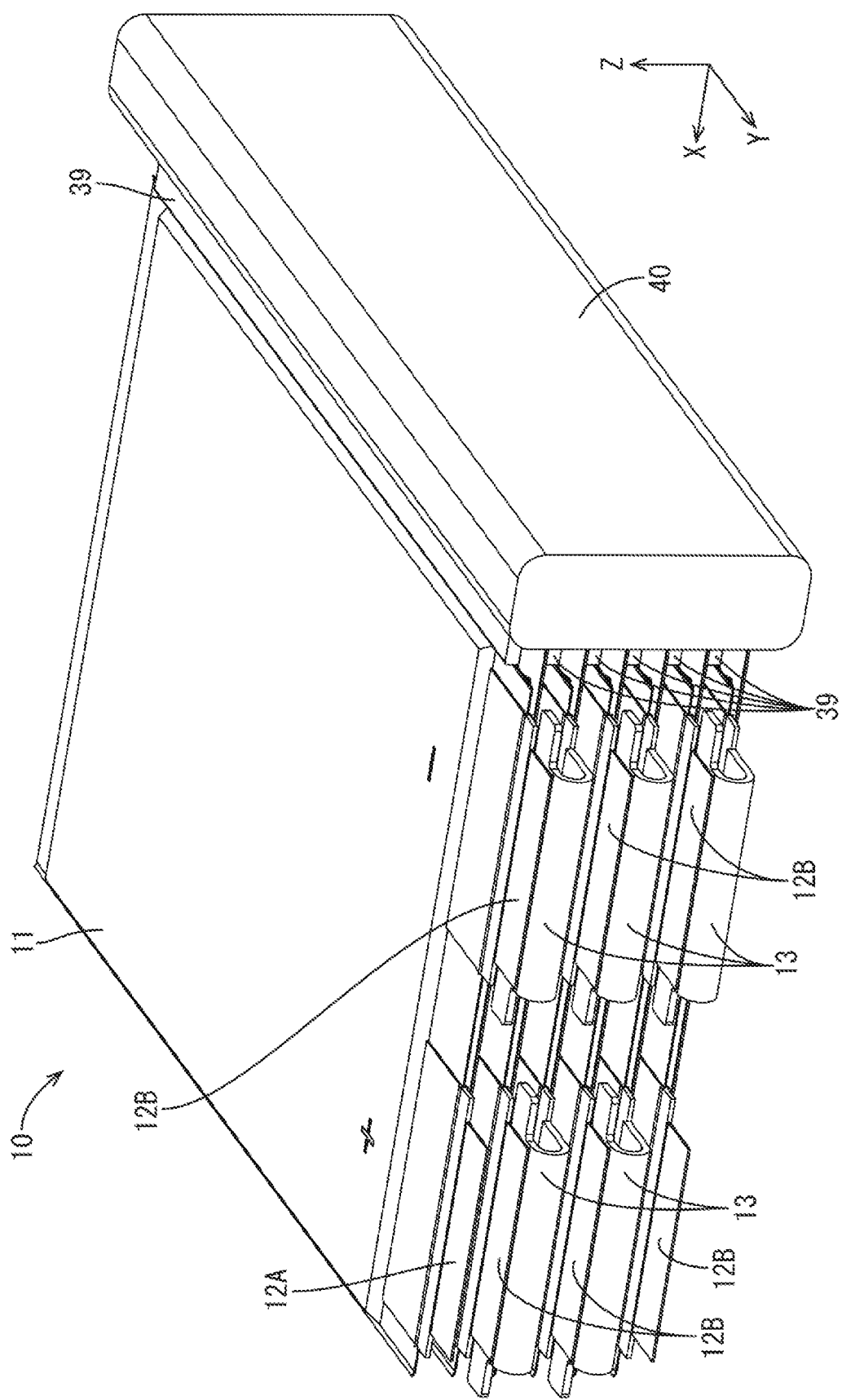
FIG. 1 is a perspective view of a power storage module in a first embodiment.
Figure 2:
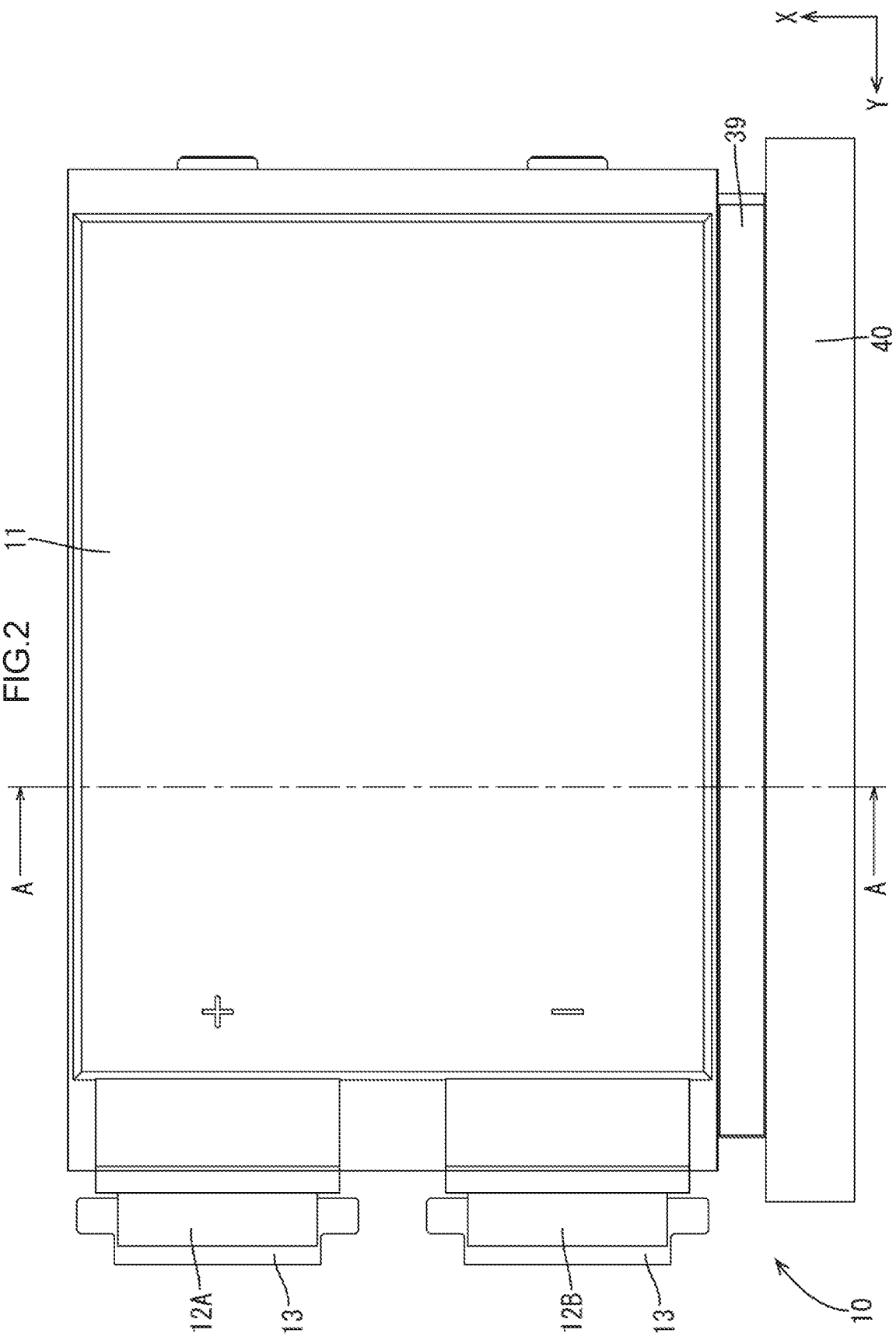
FIG. 2 is a planar view of the power storage module.
Figure 3:
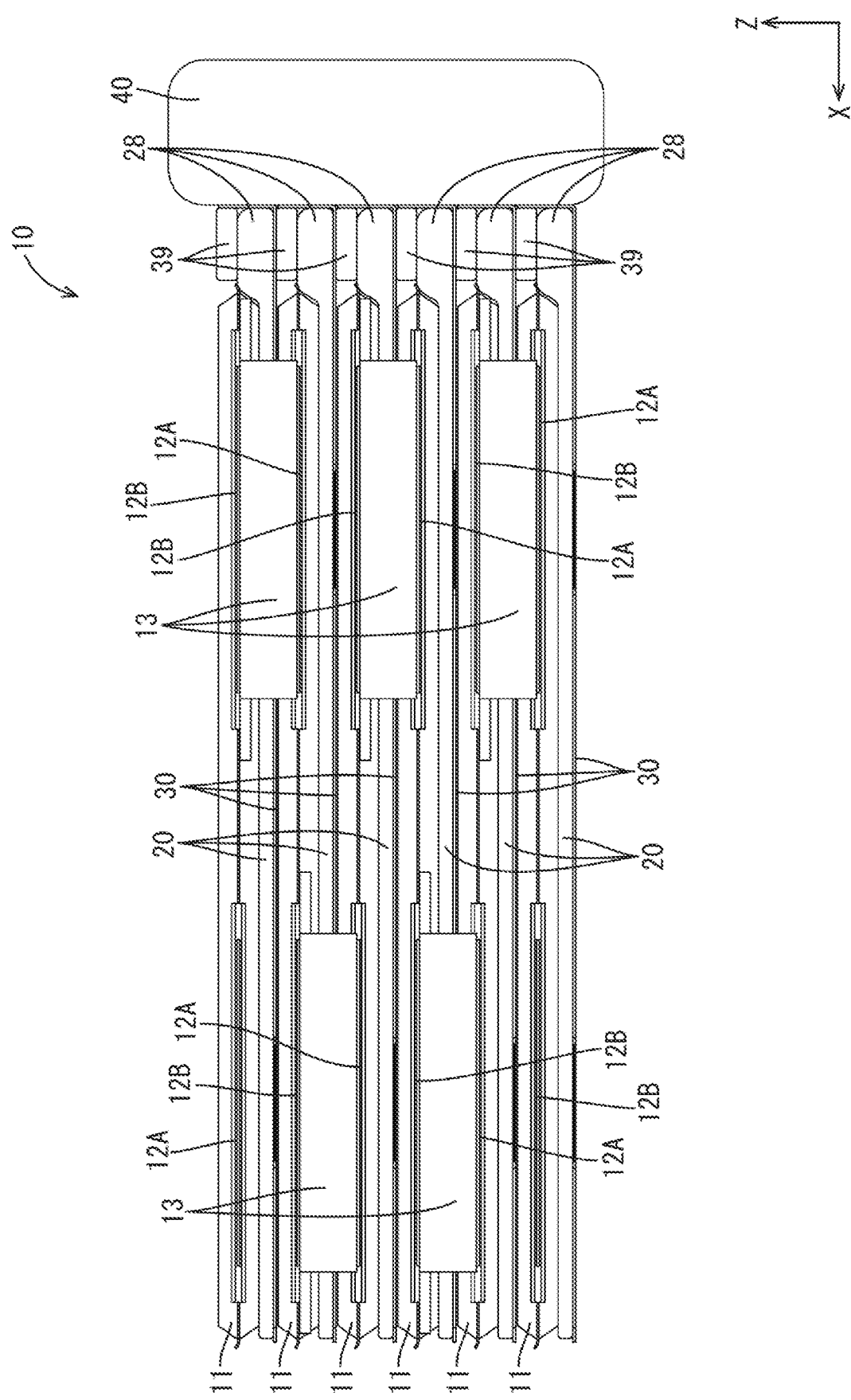
FIG. 3 is a front view of the power storage module.

Each of the power storage elements 11 is formed by sandwiching a power storage factor not illustrated between a pair of battery laminate sheets and bonding side edges of the battery laminate sheets in a liquid-tight manner by a publicly known method such as heat welding. A positive electrode terminal 12A and a negative electrode terminal 12B in metallic foil form protrude from the front end edge of each of the power storage elements 11, from inside to outside of the battery laminate sheets in a liquid-tight state with the inner surface of the battery laminate sheet as illustrated in FIG. 1. The electrode terminal 12A and the electrode terminal 12B of each of the power storage elements 11 are disposed with a space therebetween and are electrically connected to the internal power storage factor.

The plurality of power storage elements 11 are vertically aligned and the adjacent power storage elements 11 are disposed such that one electrode terminal 12A is positioned next to the other electrode terminal 12B. The adjacent electrode terminal 12A and electrode terminal 12B are electrically connected together via a plurality of (five in the present embodiment) U-shaped connection members 13. The electrode terminals 12A, 12B and the connection members 13 are connected together by a publicly known method such as laser welding, ultrasonic welding, or brazing, for example. The adjacent electrode terminals 12A and 12B are connected by the connection members 13, so that the plurality of power storage elements 11 are connected in series.

In the present embodiment, examples of the power storage elements 11 include secondary batteries such as lithium-ion secondary batteries or nickel-metal-hydride secondary batteries, capacitors such as electric double-layer capacitors or lithium ion capacitors, and any type can be selected as necessary.

Cooling Members 20

Each of the cooling members 20 includes a coolant 21 that varies between liquid and gaseous states, an absorption member 22 that absorbs the coolant 21, and a sealing body 25 that hermetically seals the coolant 21 and the absorption member 22, as illustrated in FIG. 4. The coolant 21 can be one or more selected from a group consisting of perfluorocarbon, hydrofluoroether, hydrofluoroketone, fluorine inert liquid, water, and alcohols such as methanol and ethanol, for example. The coolant 21 may have insulating properties or conductive properties. The amount of the coolant 21 sealed in the sealing body 25 can be selected as necessary.

The absorption member 22 has a substantially rectangular sheet shape. The absorption member 22 is formed from a material that can absorb the coolant 21. The absorption member 22 may be formed by processing a material configured to absorb the coolant 21 in fiber form and weaving into a fabric or may be formed from a non-woven fabric. The form of the non-woven fabric may be fiber sheet, web (thin film sheet made of fiber only), or bat (blanket-like fiber). The material for the absorption member 22 may be natural fiber, synthetic fiber formed from synthetic resin, or a combination of natural fiber and synthetic fiber.

The absorption member 22 is disposed in a wide region as compared to the region overlapping the power storage element 11, and thus the absorption member 22 in the sealing body 25 includes an absorption extension portion 23 that is extended from the region overlapping the power storage element 11 to a region not overlapping the power storage element 11.

The sealing body 25 can be formed by bonding together two substantially rectangular sheet members in a liquid-tight manner by a publicly known method such as adhesion, welding, or deposition, for example. Each of the sheet members is formed by laminating a synthetic resin film to the both sides of a metallic sheet. The metal constituting the metallic sheet can be any metal selected from among aluminum, aluminum alloy, copper, and copper alloy as necessary. The synthetic resin constituting a synthetic resin film can be any synthetic resin selected from among polyolefins such as polyethylene and polypropylene, polyesters such as polybutylene terephthalate and polyethylene terephthalate, polyamides such as nylon 6 and nylon 6, 6 as necessary. The sealing body 25 according to the present embodiment is formed by stacking and thermally fusing the surfaces of two sheet members with synthetic resin films.

Figure 6:
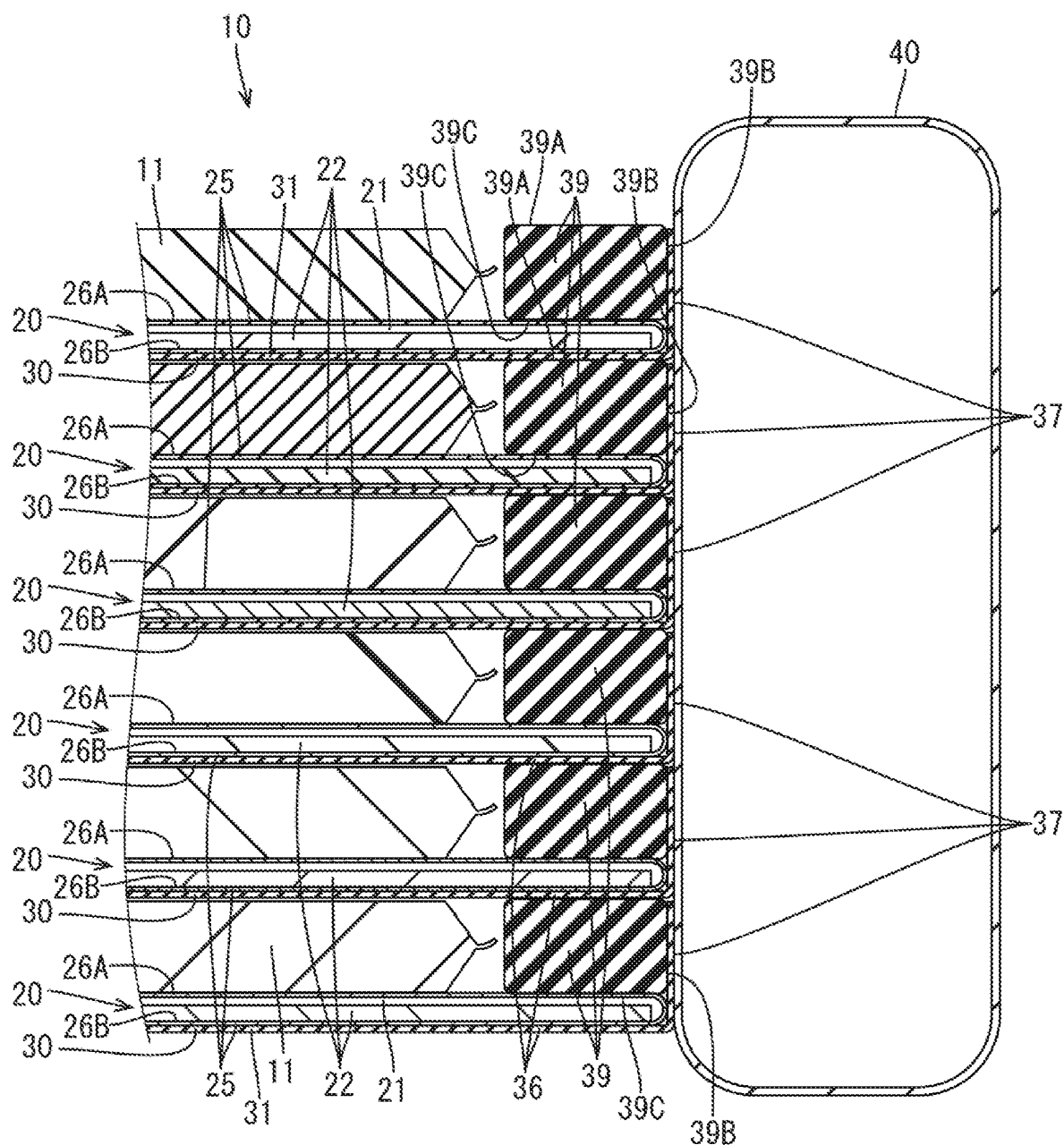
FIG. 6 is a cross-sectional view of FIG. 5 in which a sealing body is not bulged or deformed.
Figure 7:
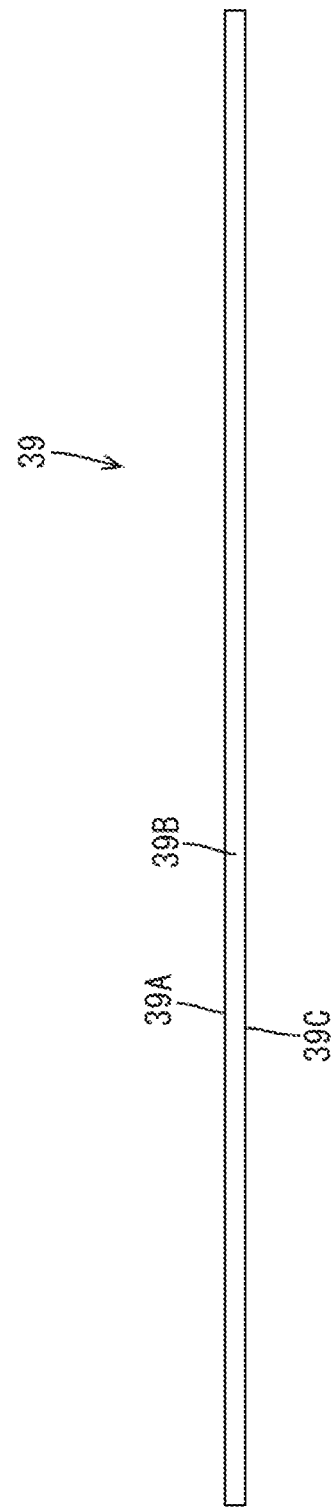
FIG. 7 is a side view of an elastic member.

The sealing body 25 has a first sheet portion 26A to cover the upper side of the absorption member 22 and a second sheet portion 26B to cover the lower side of the absorption member 22 as illustrated in FIG. 6. The upper surface of the first sheet portion 26A is in contact with the lower surface of the power storage element 11 and the lower surface of the second sheet portion 26B is in contact with the upper surface of the heat transfer plate 30. A portion of the first sheet portion 26A extended to a region not overlapping the power storage element 11 and covering the absorption extension portion 23 of the absorption member 22 is set as a bulging portion 28 that is deformable by evaporation of the coolant 21 in the sealing body 25.

The bulging portion 28 is formed when the sealing body 25 becomes deformed and bulged with a rise in the inner pressure of the sealing body 25 caused by evaporation of the coolant 21 in the sealing body 25. The portion of the sealing body 25 other than the bulging portion 28 does not bulge or deform even with a rise in the inner pressure caused by evaporation of the coolant 21 in the sealing body 25 because the portion is in contact with the power storage element 11 and the heat transfer plate 30 and is restricted in bulging.

Heat Transfer Plates 30

Each of the heat transfer plates 30 has a rectangular shape and stacked on the power storage element 11 with the cooling member 20 therebetween and is formed from a member with high thermal conductivity such as aluminum, aluminum alloy, copper, or copper alloy. Each of the heat transfer plates 30 includes: a flat plate-shaped contact portion 31 that is in contact with the power storage element 11 and the second sheet portion 26B; a heat transfer extension portion 36 that extends flush with the contact portion 31 on the right side of the contact portion 31; a partition wall 37 that extends from an end edge of the heat transfer extension portion 36 in a direction orthogonal to the plate surface of the heat transfer extension portion 36. The contact portion 31 has a rectangular shape and is stacked on a region of the power storage element 11 to receive heat from the power storage element 11. The partition wall 37 has a size (height) to contact the entire right side surfaces of the elastic member 39 and the bulging portion 28, and the outer surface of the partition wall 37 is in surface contact with the left side surface of a heat dissipation member 40.

Elastic Members 39

Figure 5:
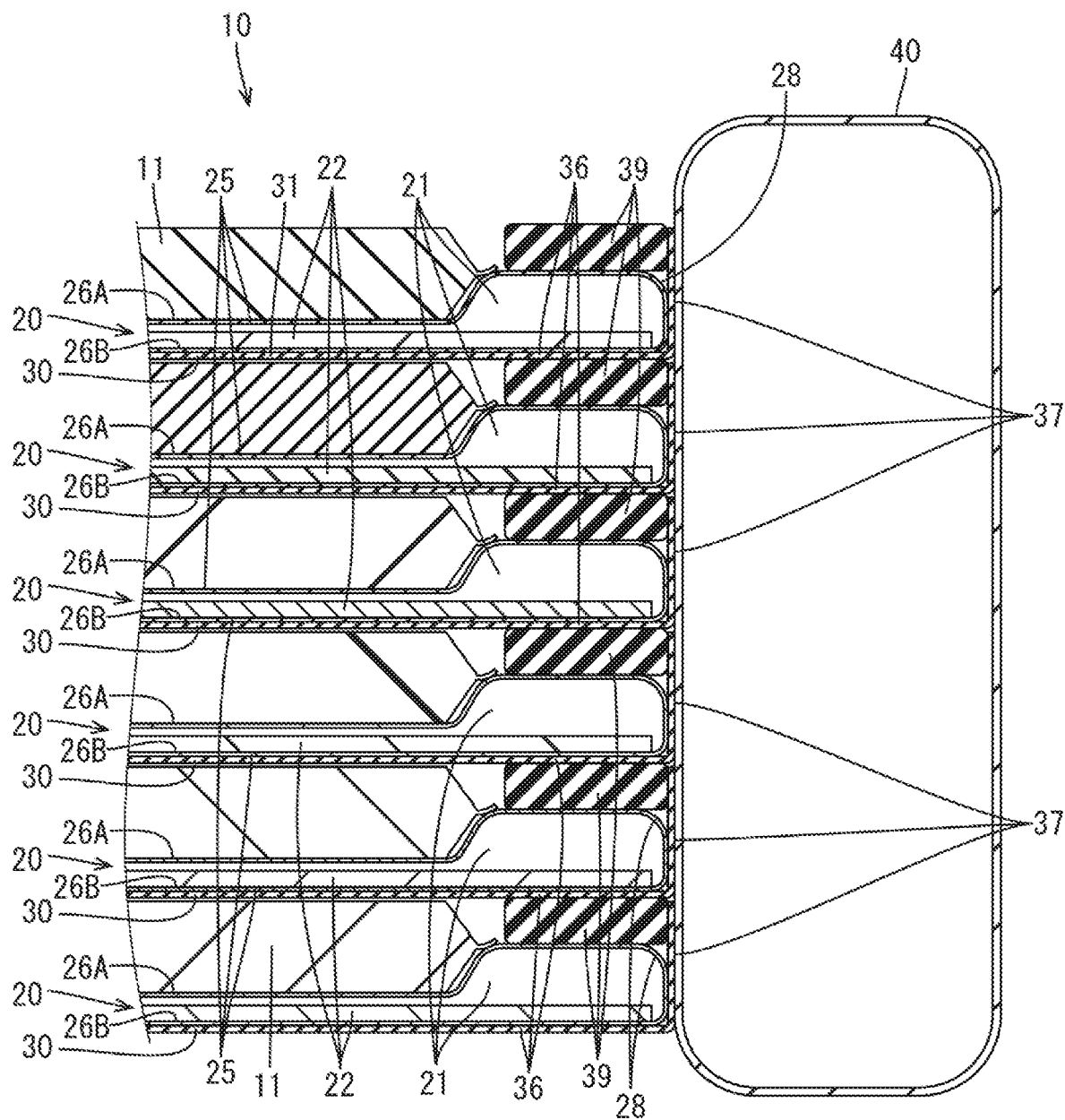
FIG. 5 is a partially enlarged cross-sectional view of FIG. 4.

Each of the elastic members 39 is an elastically deformable sponge, for example, that is made of a porous synthetic resin, has a rectangular cross section, and extends in a belt shape in a front-back direction. As illustrated in FIG. 6, an upper surface 39A of the elastic member 39 is in surface contact with a lower surface of the heat transfer extension portion 36 of the heat transfer plate 30 on the upper-stage side (adjacent), a right side surface 29B of the elastic member 39 is in surface contact with a left surface of the partition wall 37 of the heat transfer plate 30, and a lower surface 39C of the elastic member 39 is in surface contact with an upper surface of the sealing body 25 (bulging portion 28). The elastic member 39 is fixed to the lower surface of the heat transfer extension portion 36 and the upper surface of the sealing body 25 by an adhesive or the like, for example, but the elastic member 39 may not be fixed by an adhesive or the like. When the coolant 21 evaporates and the sealing body 25 bulges and deforms to form the bulging portion 28, as illustrated in FIG. 5, the elastic member 39 elastically contracts and the coolant 21 becomes condensed and the bulging portion 28 contracts and returns to the original form, and then the elastic member 39 elastically bulges. Accordingly, the heat of the power storage elements 11 transfers to the heat transfer plates 30 vertically adjacent to each other with the cooling members 20 and the elastic members 39 therebetween and the heat dissipation member 40, and then is dissipated from the heat dissipation member 40 to the outside.

Heat Dissipation Member 40

The heat dissipation member 40 is disposed on a lateral side of the power storage module 10 to dissipate heat having been transferred to the heat transfer plates 30 to the outside. The left side surface (power storage module 10 side surface) of the heat dissipation member 40 closely adheres to the outer surfaces of the partition walls 37 of the heat transfer plates 30. The heat dissipation member 10 is formed from a metal such as aluminum or aluminum alloy and has an inlet opening and an outlet opening for a cooling material not illustrated. A cooling liquid as a cooling material is introduced into the lower inlet opening and discharged from the upper outlet opening. The cooling liquid circulates through a heat dissipation path not illustrated to dissipate heat having been transferred to the cooling liquid to the outside. The heat dissipation member 40 may have a pipe (not illustrated) for passage of the cooling liquid entirely extending inside with a plurality of folds. In the present embodiment, the cooling liquid is water. However, the cooling liquid is not limited to this but may be a liquid such as oil. Alternatively, the cooling liquid may be an antifreeze liquid. In addition, the cooling liquid is not limited to a liquid but may be a gas.

The present embodiment produces the following operations and advantageous effects.

The power storage module 10 includes: the power storage element 11; the cooling member 20 that has the coolant 21 and the sealing body 25 hermetically sealing the coolant 21, is stacked on the power storage element 11, and is configured to form the bulging portion 28 by deformation of the sealing body 25 caused by evaporation of the coolant 21 in a region not overlapping the power storage element 11; the heat transfer plate 30 that is stacked on the power storage element 11 with the cooling member 20 sandwiched therebetween; and the elastic member 39 that abuts with the heat transfer plate 30 and the bulging portion 28 and is elastically deformable.

According to the present embodiment, it is possible to dissipate heat from the power storage element 11 via the cooling member 20 in which the coolant 21 is sealed in the sealing body 25 and the heat transfer plate 30. Accordingly, as compared to the configuration in which the coolant 21 is charged in the case where the power storage element 11 is stored, for example, the case does not necessarily need to be sealed. This makes it possible to simplify the configuration of the power storage module 10. In the case of using the cooling member 20 and the heat transfer plate 30 for dissipating heat from the power storage element 11, when the bulging portion 28 formed by the bulging and deformation of the sealing body 25 is not in contact with the heat transfer plate 30, the heat of the bulging portion 28 is dissipated via a space with low heat conductivity (air), which causes a problem of poor dissipation of heat from the bulging portion 28. According to the present embodiment, when the elastic member 39 abuts with the heat transfer plate 30 and the bulging portion 28, the heat of the bulging portion 28 is transferred to the heat transfer plate 30 via the elastic member 39 to allow heat dissipation to the outside via the heat transfer plate 30, thereby to improve heat dissipation property. In addition, the elastic member 39 is elastically deformed according to the bulging of the bulging portion 28, so that it is possible to lengthen the time during which the elastic member 39 is in contact with the bulging portion 28 to improve heat conductivity.

The elastic member 39 is a sponge, and an upper surface 39A (outer surface) and a side surface 39B (outer surface) of the sponge contact surfaces of the heat transfer plate 30 to enhance heat conductivity between the elastic member 39 and the heat transfer plate 30.

The heat transfer plate 30 has the partition wall 37 that extends in a direction different from a surface on which the power storage element 11 is stacked and separates the elastic member 39 such that the partition wall 37 and the elastic member 39 abut with each other.

This makes it possible to transfer the heat of the bulging portion 28 to the partition wall 37 via the elastic member 39 to improve heat dissipation property.

The power storage module 10 includes the plurality of cooling members 20, the plurality of power storage elements 11, and the plurality of heat transfer plates 30, and the elastic member 39 is sandwiched between the heat transfer plates 30 and the bulging portions 28.

Accordingly, it is possible to improve heat conductivity among the bulging portions 28, the heat transfer plates 30, and the elastic members 39.

The cooling member includes the absorption member 22 that is disposed in the sealing body 25 to absorb the coolant 21.

Accordingly, the coolant 21 can be easily moved by the absorption member 22, which makes it possible to improve the cooling performance of the cooling members 20.

Second Embodiment

Next, a second embodiment will be described with reference to FIGS. 8 to 13. A power storage module 50 in the second embodiment has elastic members 51 as springs between heat transfer plates 30 and bulging portions 28. Hereinafter, the identical components to those in the first embodiment will be given the identical reference signs to those in the first embodiment and descriptions thereof will be omitted.

Figure 8:
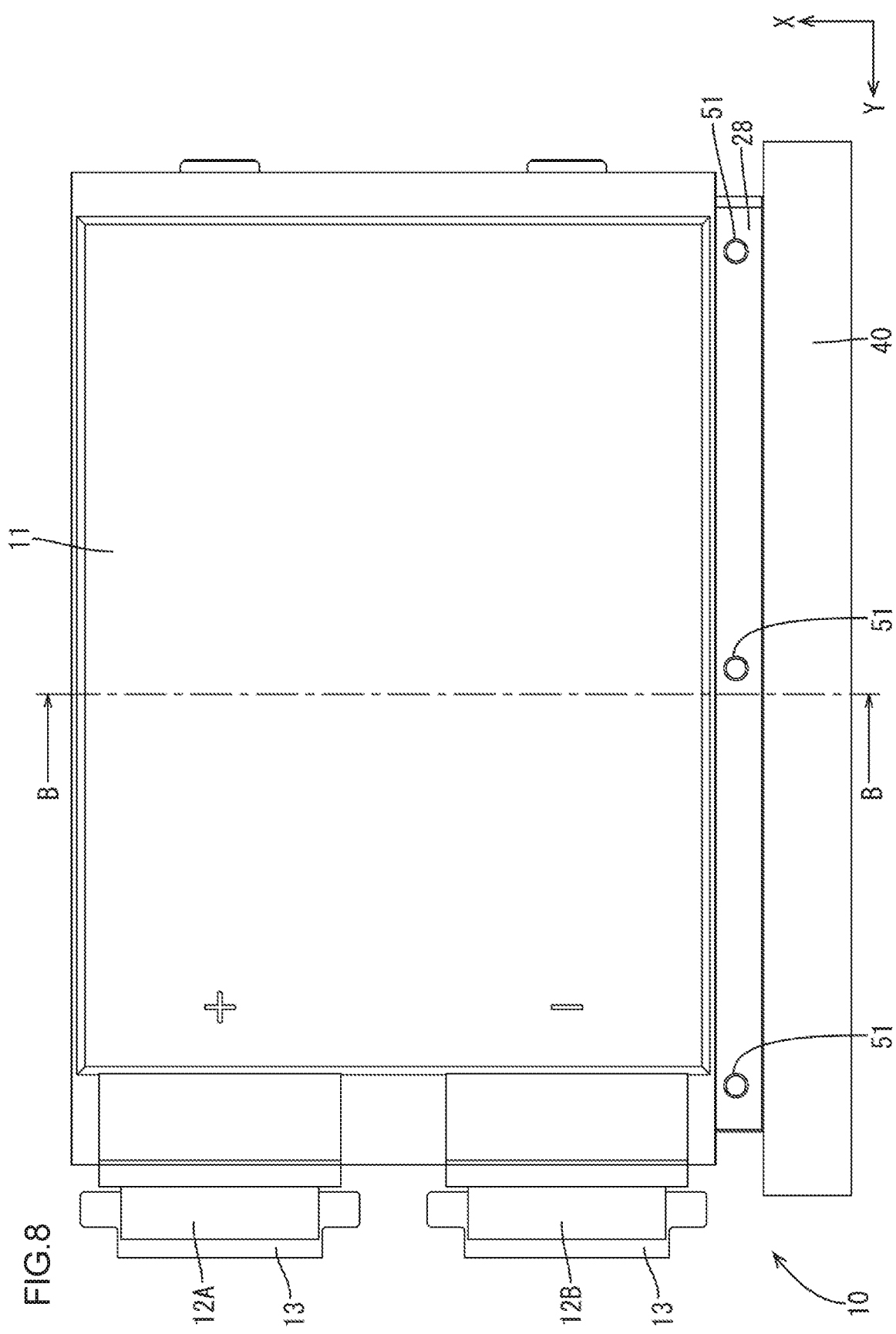
FIG. 8 is a plane view of a power storage module in a second embodiment.
Figure 9:
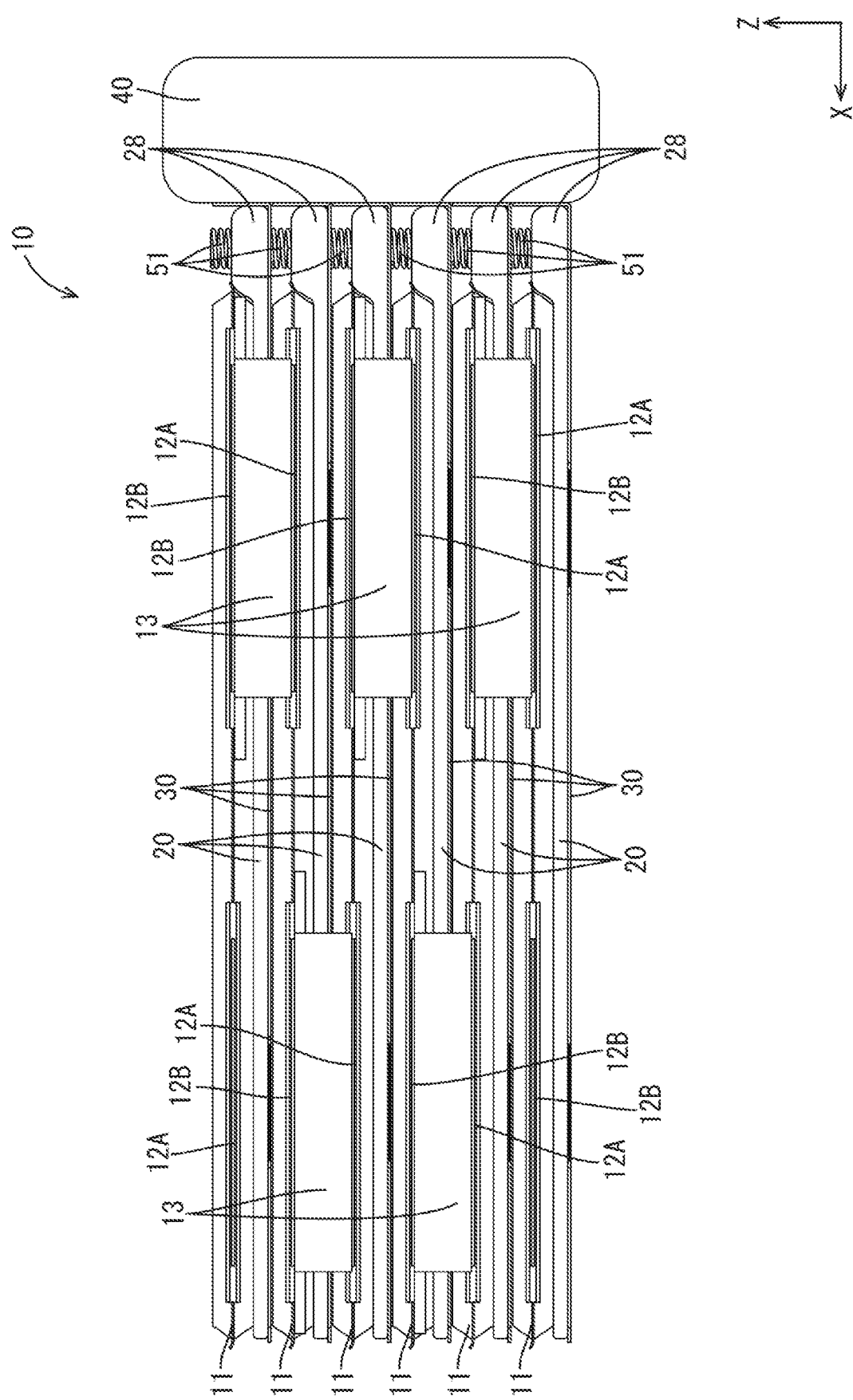
FIG. 9 is a front view of the power storage module.
Figure 10:
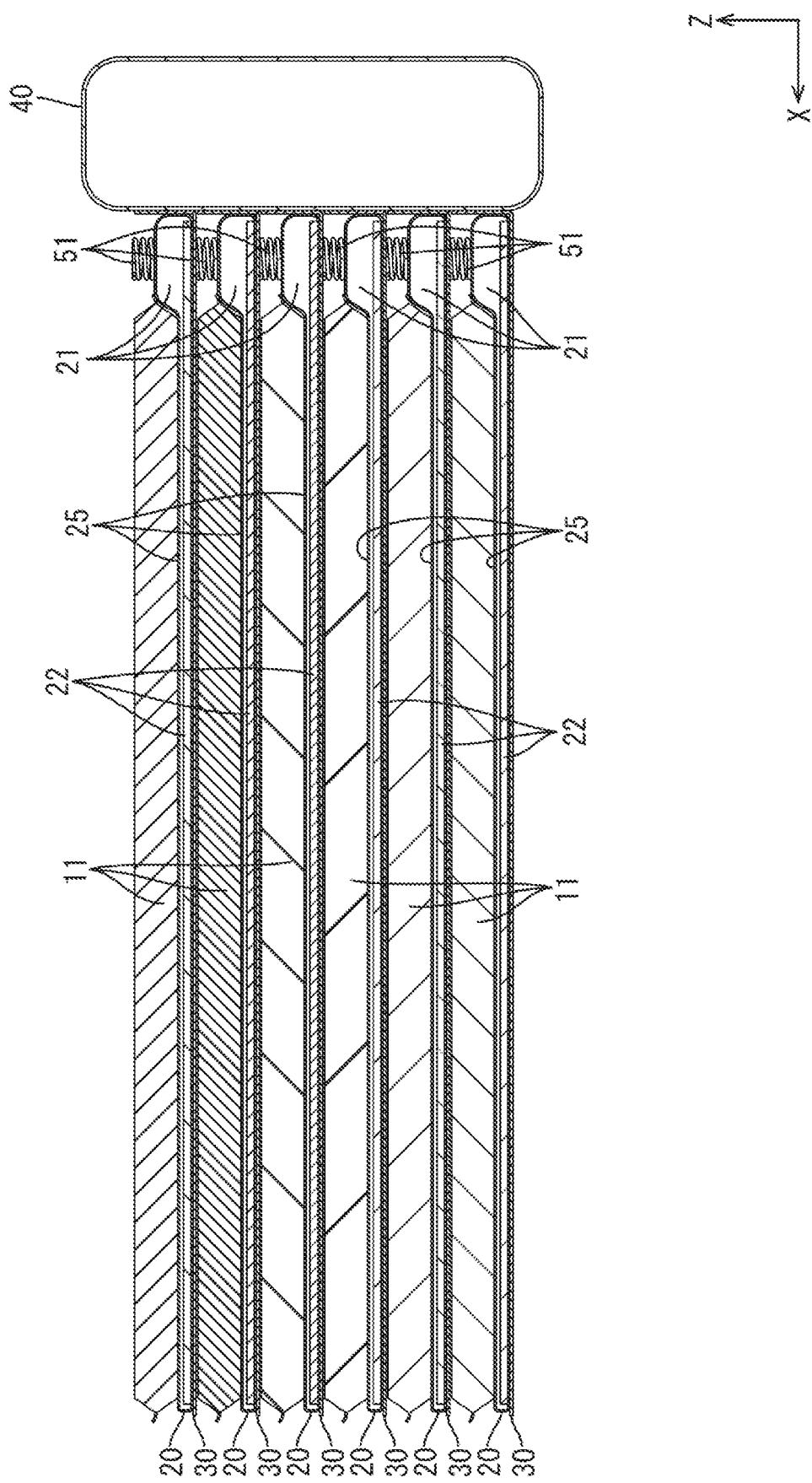
FIG. 10 is a cross-sectional view of FIG. 8 taken along line B-B.
Figure 11:
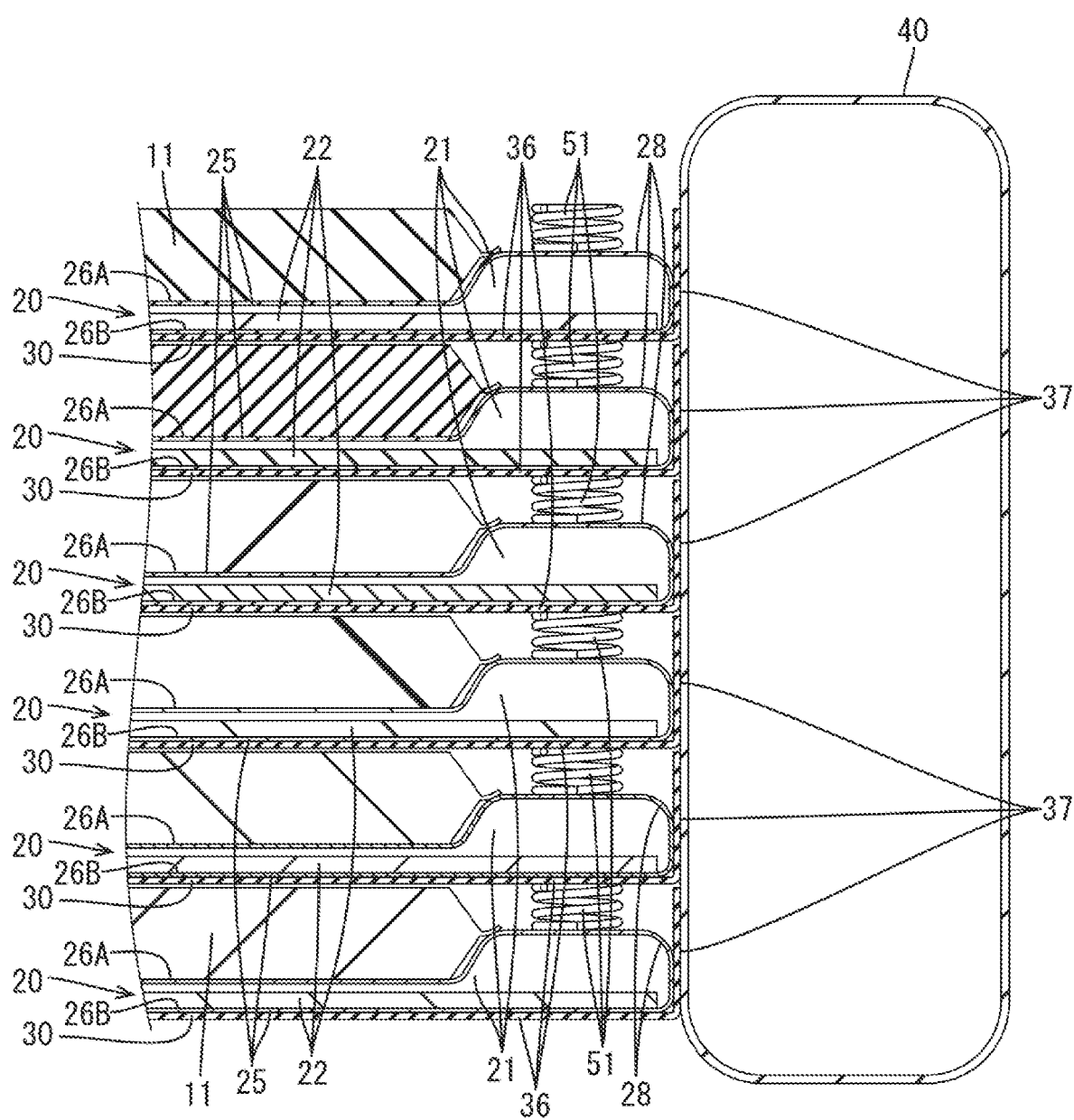
FIG. 11 is a partially enlarged cross-sectional view of FIG. 10.
Figure 13:
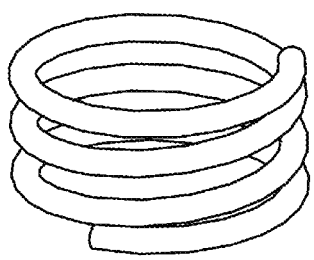
FIG. 13 is a perspective view of a spring.

As illustrated in FIG. 8, a plurality of (three for each cooling member in the present embodiment) elastic members 51 are fixed to each of the cooling members 20 with a space above the upper surface of the bulging portion 28. Each of the elastic members 39 is a coil spring as illustrated in FIG. 13. This spring is made of a synthetic resin or a metal, for example. An end portion of the elastic member 51 is fixed to at least one of the heat transfer plate 30 and the bulging portion 28. In the present embodiment, the end portion of the elastic member 51 is fixed to the bulging portion 28 by soldering or an adhesive, for example. Alternatively, the end portion of e elastic member 51 may be fixed to the heat transfer plate 30 or fixed to both the heat transfer plate 30 and the bulging portion 28, for example.

Figure 12:
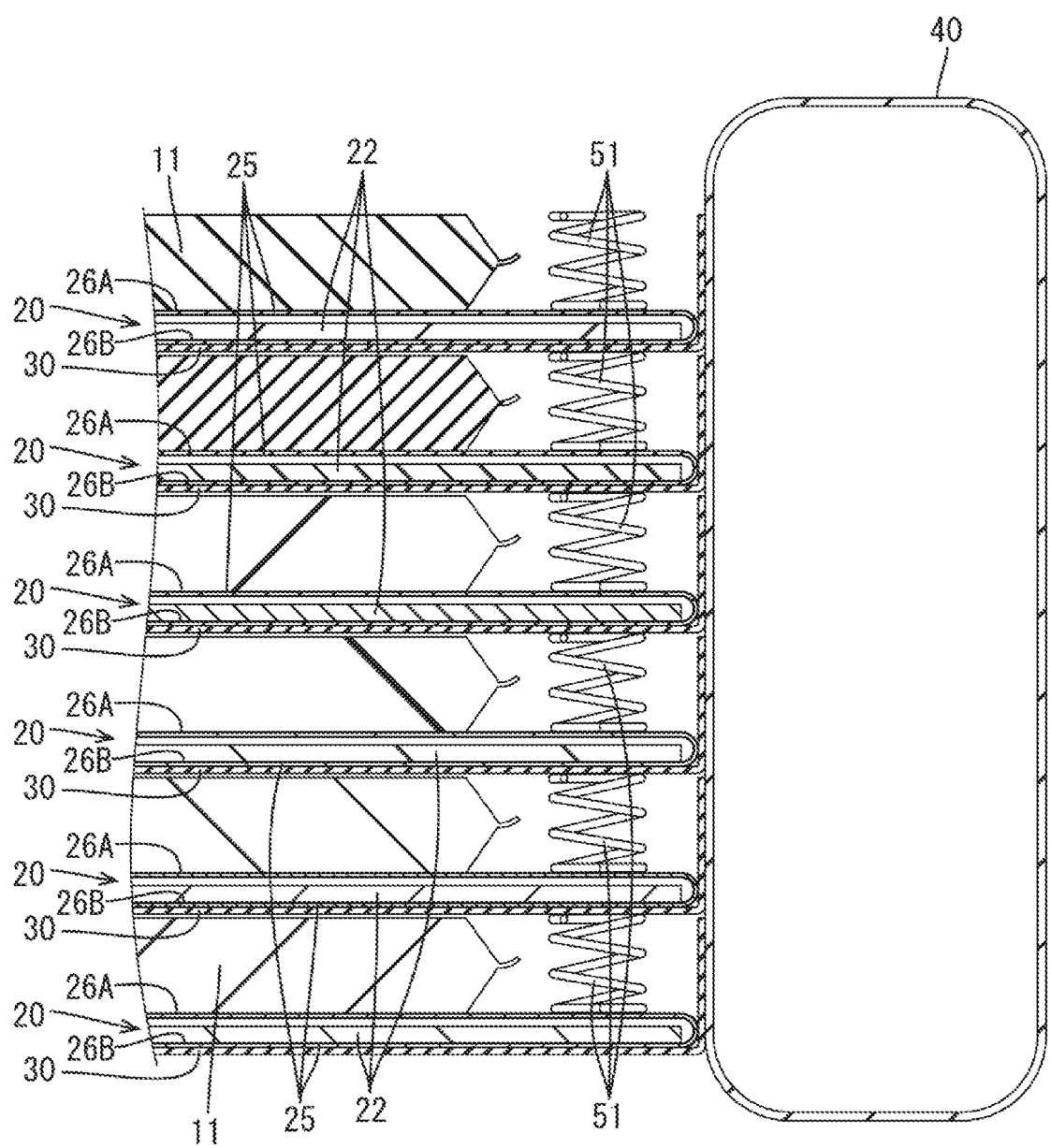
FIG. 12 is a cross-sectional view of FIG. 11 in which a sealing body is not bulged or deformed.

According to the second embodiment, the bulging portion 28 and the heat transfer plate 30 on a stage different from the stage of the bulging portion 28 with the power storage element 11 sandwiched therebetween are coupled to each other by the elastic member 39 (FIG. 12). When the bulging portions 28 of the cooling members 20 bulge and deform (FIG. 11), the elastic members 51 elastically contract between the bulging portions 28 and the heat transfer extension portions 36 of the heat transfer plates 30. When the bulging portions 28 no longer bulge or deform, the elastic members 51 extend to the original strength (FIG. 12).

Other Embodiments

The technique described herein is not limited to the embodiments described above and illustrated in the drawings. For example, the following embodiments are included in the scope of the technique described herein:

(1) The elastic members 39, 51 are not limited to the sponges or springs in the foregoing embodiments. The elastic members are not limited to coil springs but may be plate springs or rubber other than springs, for example, as far as they are higher in thermal conductivity than air.

(2) The numbers of the power storage elements 11, the cooling members 20, the heat transfer plates 30, and the elastic members 39, 51 are not limited to the numbers in the foregoing embodiments but can be changed as appropriate.

(3) The heat dissipation member 40 may not be included. For example, the power storage module 10 may be covered with a metallic or synthetic resin case not illustrated, so that the heat of the power storage module 10 is dissipated via the case to the outside without the intervention of the heat dissipation member 40. In addition, the case may be a part of the heat dissipation member 40 or the case may cover the entire power storage module 10 including the heat dissipation member 40, for example. In this case, for example, the case may sandwich the power storage module 10 from the upper and lower sides to hold the power storage module 10. The upper end of the elastic member 39, 51 on the topmost stage is not fixed in the foregoing embodiment, but the upper end of the elastic member 39, 51 on the topmost stage may be fixed. For example, the upper end of the elastic member 39, 51 may be fixed by a case or the like not illustrated, so that the elastic members 39, 51 can elastically deform.

EXPLANATION OF SYMBOLS 10, 50: Power storage module
11: Power storage element
20: Cooling member
21: Coolant
22: Absorption member
25: Sealing body
28: Bulging portion
30: Heat transfer plate
39, 51: Elastic member
40: Heat dissipation member

The invention claimed is:

1. A power storage module comprising:
a power storage element;
a cooling member that has a coolant and a sealing body hermetically sealing the coolant, is stacked on the power storage element, and is configured to form a bulging portion by deformation and bulge of the sealing body caused by evaporation of the coolant in the sealing body, wherein the bulging portion is provided in a region of the sealing body not overlapping the power storage element;
a heat transfer plate that is stacked on the power storage element with the cooling member therebetween; and
an elastic member that abuts with the heat transfer plate and the bulging portion and is elastically deformable.

2. The power storage module according to claim 1, wherein
the elastic member is a sponge, and
an outer surface of the sponge contacts a surface of the heat transfer plate.

3. The power storage module according to claim 1, wherein
the elastic member is a spring, and
an end portion of the spring is fixed to at least one of the heat transfer plate and the bulging portion.

4. The power storage module according to claim 1, wherein the heat transfer plate has a partition wall that extends in a direction different from a surface on which the power storage element is stacked and separates the elastic member such that the partition wall and the elastic member abut with each other.

5. The power storage module according to claim 1, comprising:
a plurality of the cooling members;
a plurality of the power storage elements; and
a plurality of the heat transfer plates, wherein the elastic member is sandwiched between the heat transfer plates and the bulging portions.

6. The power storage module according to claim 1, wherein the cooling member includes an absorption member that is disposed in the sealing body to absorb the coolant.

* * * * *